United States Patent [19]
Miller et al.

[11] Patent Number: 5,499,533
[45] Date of Patent: Mar. 19, 1996

[54] DOWNHOLE PRESSURE GAUGE CONVERTER

[76] Inventors: Mark Miller, 13360 Wheelock Rd.; Thomas W. Miller, 7 Airport Rd., both of Corry, Pa. 16407

[21] Appl. No.: 935,860

[22] Filed: Aug. 26, 1992

[51] Int. Cl.⁶ .................................................. E21B 21/08
[52] U.S. Cl. .................................. 73/152; 73/734; 338/40
[58] Field of Search ................................. 73/151, 151.5, 73/152, 153, 155, 734; 346/33 TP, 33 WL; 338/40

[56] References Cited

U.S. PATENT DOCUMENTS

| | | | |
|---|---|---|---|
| 2,379,996 | 7/1945 | Silverman | 73/734 X |
| 2,932,807 | 4/1960 | Bowins | 338/40 |
| 3,145,359 | 8/1964 | Parkinson | 338/40 |
| 4,157,659 | 6/1979 | Murdock | 73/151 |
| 4,355,365 | 10/1982 | McCracken et al. | 364/569 |

FOREIGN PATENT DOCUMENTS

| | | | |
|---|---|---|---|
| 0203283 | 3/1986 | European Pat. Off. | 73/734 |

*Primary Examiner*—Richard E. Chilcot, Jr.
*Assistant Examiner*—Joseph L. Felber
*Attorney, Agent, or Firm*—Kenneth W. Wargo

[57] ABSTRACT

The apparatus disclosed is a type of downhole pressure gauge to be used to measure and record pressure information about oil and gas wells. The apparatus measures fluctuations in pressure by means of a mechanical pressure sensitive device, such as a Bourdon tube, and records and stores this information by converting mechanical movement, associated with pressure changes as detected by the mechanical pressure sensitive device, into corresponding voltage changes across a potentiometer which are stored in an electronic memory board. The change in voltage over time corresponds to the change in well pressure over time, thereby providing important information to the well operator. Also disclosed is a method for measuring well pressure by means of combining a mechanical pressure sensitive device with an electrical system and an electronic memory board for storing the measurements. Also disclosed is a kit, whereby an existing downhole mechanical pressure gauge can be converted to a mechanical/electrical combination by the replacement of certain parts.

11 Claims, 1 Drawing Sheet

DOWNHOLE PRESSURE GAUGE CONVERTER

BACKGROUND OF THE INVENTION

1. Field of the Invention

This invention relates generally to devices for measuring and recording the pressure in oil and gas wells, specifically to a device which, when connected to a mechanical recorder of the type now commonly in use, will allow the pressure measurements to be converted into corresponding voltage changes and stored in a memory device. More particularly, this invention relates to a downhole device meant to be lowered into the well bore to take pressure measurements, as opposed to devices used at the surface to measure well pressure.

2. Description of the Prior Art

There are currently two basic types of downhole pressure gauges commonly available to measure and record pressure information about oil and gas wells. One of these types, the older one, is a mechanical device, while the newer one uses electronics.

The downhole mechanical pressure gauges have been around for over sixty years. When completely assembled, they are in the form of a long tube with a bullet shape on one end, and an eyelet or socket on the other which allows a wire to be passed through and attached. This wire is then used to lower the pressure gauge into the well bore and retrieve it after the measurement has been completed.

Typically, the fully-assembled mechanical gauge actually consists of three separate parts which have been threadedly attached together to form an elongated tube. The first part contains a Bourdon pressure sensing element attached to a connecting pin. As the Bourdon tube detects changes in well pressure, these pressure changes are translated into a corresponding rotational movement in the connecting pin. This part of the pressure gauge, with the Bourdon tube, is connected to the second part of the pressure gauge, which contains a recording unit and clock. The second part is threaded together with the first part in such a manner that the connecting pin engages a stylus when the two parts are joined. The stylus, in turn, makes contact with a recording chart, enclosed in a chart holder. The recording chart is a thin metal sheet rolled into a cylinder shape and inserted into the chart holder. The chart holder, in turn, is attached to a mechanical clock which drives the chart holder forward, relative to the stylus, at a constant speed for a pre-determined amount of time as chosen by the user. As the well pressure fluctuates over time, the changes are detected by the Bourdon tube and translated into rotation in the connecting pin and the stylus. As the stylus moves, it scratches recording the chart, thereby recording fluctuations in pressure. Meanwhile, the mechanical clock is driving the chart holder forward at a constant rate. The net result is the production of a chart which shows well pressure as a function of time. The third part of the mechanical pressure gauge threadedly attaches to the second part at the end opposite the end attached to the first part and provides a means for the attachment of the wire used to raise and lower the mechanical pressure gauge.

In a typical application, a new chart will be inserted into the chart holder, the mechanical clock will be set, and the fully assembled pressure gauge will be lowered into the well. At the end of the test period, the pressure gauge is retrieved, and the chart removed and read to obtain a record of the well's pressure over the test period.

The second basic type of downhole pressure gauge commonly in use in the oil and gas industry is an electronic memory pressure recorder. These devices have been around since the late 1970's. Instead of a Bourdon tube to detect pressure changes, they use various electronic means for the same purpose. For example, some use the piezometric properties of quartz crystals to produce a voltage signal that varies with pressure, and which can be converted into meaningful pressure data. Other gauges of this type use strain gauge transducers to produce the voltage changes. Regardless of which means is used to produce the pressure-sensitive voltage changes, the resulting information is sent to an electronic memory storage board. The pressure sensitive voltage device and electronic memory storage board are placed into a housing of a size and shape convenient for lowering into the well, such as an elongated tube similar to the mechanical pressure gauges.

In a typical application, the electronic pressure gauge will be lowered into a well for the test period and then retrieved. The information which has been stored in the memory board can then be downloaded into a suitable device where the time/pressure information can be converted into a convenient form. Alternatively, the electronic pressure gauge is also capable of allowing well pressure to be monitored at the surface while the test is ongoing if an electrical line carrying the voltage changes is attached to the unit and run to the surface during testing, thereby allowing remote, instantaneous access to detected pressure changes.

Both of the basic types of downhole pressure gauge described above have advantages and disadvantages. The advantages of the mechanical pressure gauge are its low cost, availability, and durability. The chief disadvantages are the relatively poor accuracy of its pressure measurements, especially as the time of testing increases, and the inability to use it to conduct remote testing. The advantages of the electronic pressure gauge are its high accuracy, ease of data retrieval, and remote testing capabilities. The chief disadvantage of the electronic pressure gauge unit is its high cost, which simply cannot be justified or afforded by many small oil and gas operators.

SUMMARY OF THE INVENTION

Accordingly, several objects and advantages of the present invention are:

(a) To provide a way to eliminate the stylus, chart holder, and mechanical clock from the typical downhole mechanical pressure gauge assembly and replace it with an alternative, electronic means of sensing and recording the pressure changes detected by the Bourdon tube.

(b) To provide for this substitute means to be contained within a part of the proper size and configuration which will allow it to replace the second part now normally found in the typical downhole mechanical pressure gauge.

(c) To provide a part which can be used quickly and easily to replace the second part currently used in the typical downhole mechanical pressure gauge.

(d) To provide such a new second part as a means to convert the typical existing downhole mechanical pressure gauge into a gauge which is partly mechanical, and partly electronic, with many of the advantages of the present electronic pressure gauges, but with a significantly lower cost.

(e) To provide an adapter or conversion kit that can be easily manufactured in a variety of sizes to suit the various downhole mechanical pressure gauges now in use.

Other objects will be apparent from the reference to the ensuing description, and it is to be understood that the invention is not limited to the particular embodiment shown in the accompanying drawings, where other constructions are possible within the scope and spirit of the appended claims.

DESCRIPTION OF THE PREFERRED EMBODIMENT

Figure 1:
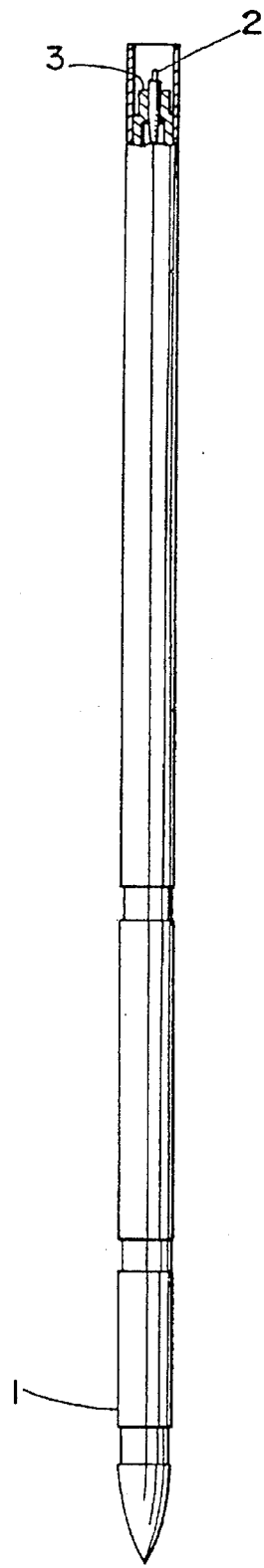
FIG. 1 is a side elevational view of the first, or Bourdon tube, part of a typical downhole mechanical pressure gauge.

FIG. 1 shows the part of a typical downhole mechanical pressure gauge as now in use which contains the pressure sensitive means in the form of a Bourdon tube. FIG. 1 shows what is referred to as the "first part" of the mechanical pressure gauge in the Description of Prior Art set forth herein. Referring to FIG. 1, the pressure sensitive means is enclosed in a cylindrical housing 1. Through various linkages, unimportant to the current invention, the changes in pressure detected by the pressure sensitive means is transferred to a connecting pin 2 as a rotational force on the connecting pin 2. The cylindrical housing 1 is provided with a threaded connector 3 which allows it to be joined to another part of similar diameter, referred to as the "second part" in the Description of Prior Art set forth herein.

Figure 2:
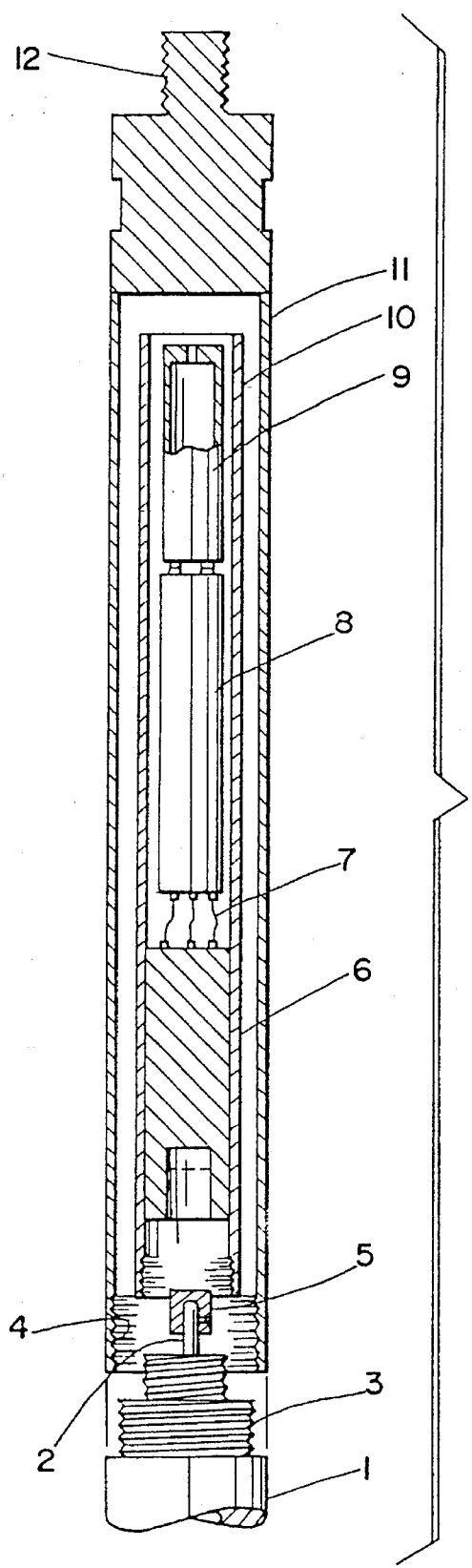
FIG. 2 is a side elevational view of the invention.

The invention relates to a substitute for the currently used second part. Referring to FIG. 2, a side elevational view of an embodiment of the invention is shown. The invention is contained in a housing 11 which is of the same general size as the currently-used second parts, and which connects to the first part in the same manner, namely by the connection of the threaded connector 3 on the first part with threaded connector 4 on the second part. Prior to making this connection, a stylus convertor block 5 is attached to the connecting pin 2. The stylus convertor block 5 shown is simply a metal sleeve with a set screw or similar means to attach it securely to the connecting pin 2. When the two housings 1 and 11 are connected, the stylus convertor block 5 will fit into a recess in a potentiometer body contained in the housing 11 of the invention. The potentiometer body 6 is connected by means of wires 7 to an electronic memory board 8 and a battery pack 9. In the preferred embodiment shown, the potentiometer body 6 electric wire 7, battery pack 9, and electronic memory board 8 are contained in their own convertor holder 10 which can be inserted into the housing 11 and suitably attached thereto. This embodiment permits the invention to be used with existing second part housings. Another embodiment would be to have the convertor holder and housing as one integral, indivisible piece. A threaded connector 12 on the end of the housing 11 opposite the end which contains the threaded connector 4 allows the housing 11 to be connected to the "third part" described in the Description of Prior art set forth herein.

In light of the above description, the operation of the invention is readily apparent. Changes in pressure detected by the mechanical device in the first part are transmitted as a variable rotational force to the connecting pin 2 and the stylus convertor block 5 which has been attached thereto. This variable rotational force is, in turn, used to produce voltage changes in conjunction with a potentiometer body 6 into which the stylus convertor block 5 fits. The connection between the stylus convertor block 5 and the potentiometer body can be either through a transducer or other electrical device, or by mechanical means. The voltage changes from the potentiometer body 6 are transmitted to an appropriate electronic memory board of the type commonly available. Power for this assembly is supplied by a battery pack 9 which can be easily replaced as the batteries wear out. The information stored in the electronic memory board 8 will correspond closely with the well pressure changes detected by the mechanical gauge in the first part. When the entire assembly has been retrieved from the well under test, the electronic memory board 8 can be downloaded and a chart showing time and pressure components can be generated.

Since many changes could be made in the above description, and many apparently widely varying embodiments of the invention could be made without departing from the scope thereof, it is intended that all matter contained in the drawings and specification shall be construed as illustrative and not in a limiting sense.

We claim:

1. A downhole pressure gauge for wells to provide measurement and recordation of the pressure and fluctuations thereof over time, comprising:

A mechanical pressure sensitive device;

A connecting pin linking the mechanical pressure sensitive device to a potentiometer in such a manner that fluctuations in well pressure as detected by the mechanical pressure sensitive device are converted into rotational changes in the connecting pin and thence into corresponding voltage changes across the potentiometer;

An electronic memory board connected to the potentiometer and capable of detecting and storing the voltage changes and expressing them as a function of time;

An electrical power source electrically connected to the potentiometer and electronic memory board;

A housing containing the above components.

2. The apparatus of claim 1 wherein the housing can be broken down into a plurality of parts, the first part of which contains the mechanical pressure sensitive device and connecting pin, and the second part of which contains the potentiometer, electronic memory board, and power source.

3. The apparatus of claim 2 wherein the first part and second part are threadedly connected together.

4. The apparatus of claim 2 wherein a removable sleeve or adapter is placed on the end of the connecting pin before the first part and second part are joined, the removable sleeve or adapter mating the connecting pin to the potentiometer.

5. The apparatus of claim 1 wherein the connecting pin is linked to the potentiometer by means of a removable sleeve or adapter which fits on the connecting pin and mates it to the potentiometer.

6. The apparatus of claim 1 wherein the mechanical pressure sensitive device is a Bourdon tube.

7. A method of obtaining measurement and recordation of well pressure, comprising:

(a) Providing a housing having a mechanical pressure sensitive device, a connecting pin, a potentiometer, an electronic memory board and an electrical power source;

(b) Providing means for the housing to be lowered into a well bore for the length of time pressure testing is desired;

(c) Measuring the fluctuation of the pressure of the well over time by the mechanical pressure sensitive device, translating the measurements by way of rotational movement of the connecting pin into proportional voltage changes across the potentiometer, and storing the measurements in the electronic memory board;

(d) Retrieving the housing from the well bore and obtaining the results of the measurements as stored on the electronic memory board.

8. A method of obtaining measurement and recordation of well pressure, comprising:

(a) Providing a housing having a mechanical pressure sensitive device, a connecting pin, and a potentiometer;

(b) Providing an electronic memory board and an electrical power source which are remotely connected by wire to the potentiometer in the housing;

(c) Providing means for the housing to be lowered into a well bore for the length of time pressure testing is desired;

(d) Measuring the fluctuation of the pressure of the well over time by the mechanical pressure sensitive device, translating the measurements by way of rotational movement of the connecting pin into proportional voltage changes across the potentiometer, and storing the measurements in the remotely located electronic memory board.

9. In a downhole pressure gauge for wells including a housing containing a mechanical pressure sensitive device with connecting pin linked to a stylus and a mechanical recording unit and clock, wherein the improvement comprises the replacement of the stylus, mechanical recording unit and clock with a potentiometer fitted to receive the connecting pin, said potentiometer being connected to an electronic memory board and a electric power source, all to be contained in the housing.

10. A kit of parts for improving conventional downhole mechanical pressure gauges for wells by replacing certain parts in such gauges, comprising:

(a) A stylus convertor block to attach to the connecting pin from the mechanical pressure sensitive device of the downhole mechanical pressure gauge; and (b) A potentiometer body with a recess designed to receive the stylus convertor block; and (c) An electronic memory board to store voltage fluctuations across the potentiometer body; and (d) An electric power source; and (e) A housing of such size and shape to allow it to hold the potentiometer body, electronic memory board, and electric power source, and to allow it to function as a component part of a conventional downhole mechanical pressure gauge.

11. The kit of claim 10 wherein the potentiometer body, electronic memory board, and electric power source are contained in a convertor holder which can fit within the conventional downhole mechanical pressure gauge after certain parts in such gauge have been removed.

* * * * *